May 10, 1955     J. F. TAPLIN     2,707,966
PRESSURE REGULATOR VALVE
Filed May 25, 1950     2 Sheets-Sheet 1

Inventor:
John F. Taplin,
by Yardley Chittick
Attorney

May 10, 1955  J. F. TAPLIN  2,707,966
PRESSURE REGULATOR VALVE
Filed May 25, 1950  2 Sheets-Sheet 2
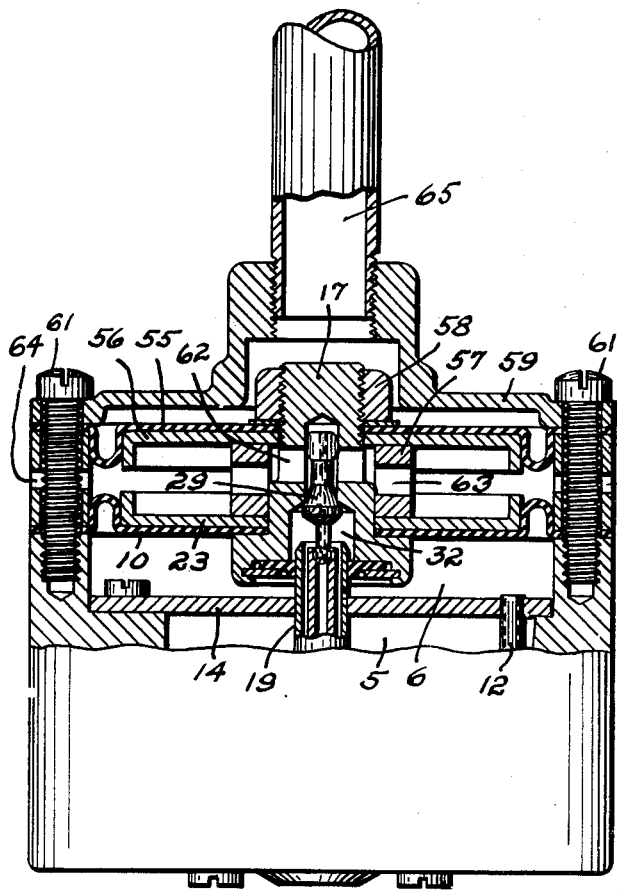
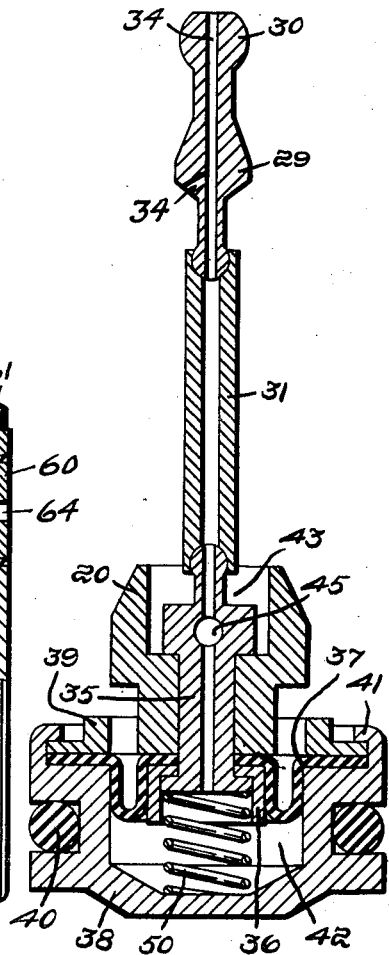
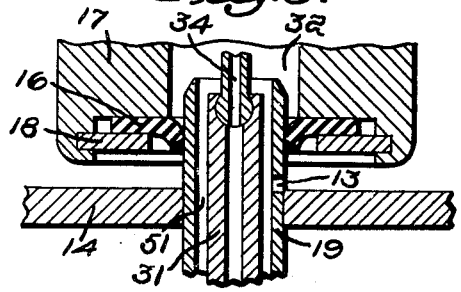
Inventor:
John F. Taplin,
by Yardley Chittick
Attorney United States Patent Office 2,707,966
Patented May 10, 1955

2,707,966

PRESSURE REGULATOR VALVE

John F. Taplin, West Newton, Mass.

Application May 25, 1950, Serial No. 164,097

20 Claims. (Cl. 137—116.5)

This invention relates to a pressure regulator and relief valve.

One of the objects of this invention is to provide a pressure regulator valve so constructed that the pressure on the outlet or downstream side of the valve may be maintained close to the desired pressure regardless of the downstream fluid consumption. The regulator is so designed that changes in downstream pressure cause a substantially instantaneous actuation of the supply valve to permit the flow of additional high pressure fluid from the upstream side in sufficient quantity to maintain constantly the required downstream pressure.

A further object of the invention is to provide a regulator valve construction arranged to compensate for the reduced force exerted by the main control spring or other force applying means as the valve opens due to a pressure drop with corresponding elongation of the control spring thereby to restore the required pressure.

Another object of the invention is to provide in combination with a regulator valve a pressure relief valve which will bleed excess pressure from the downstream side whenever such condition develops.

Another object of the invention is to provide a valve construction in which the supply valve pintle and the relief valve pintle are connected together to move longitudinally in unison but at the same time are balanced with respect to the pressure to which they are normally subjected so that the operative force is applied almost entirely by the main control pressure means.

Another object of the invention is to provide a construction in which there is an auxiliary spring for maintaining the supply valve closed when the downstream pressure is at the proper level but which spring will be immediately neutralized as soon as the supply valve has opened so that further actuation of the supply valve will be under the influence of the control spring on other control pressure means.

A further object of the invention is to provide a pressure regulator valve which includes relief mechanism so arranged that excess pressure escaping through said relief valve will not pass through the main pressure control chamber except in very limited degree if at all.

Another object of the invention is to provide a pressure regulator and relief valve that will be substantially rectangular in plan with the pressure control diaphragm being generally oval in shape to conform in the main with the essential rectangular configuration of the aligned inlet and outlet ports having a supply valve therebetween. This construction permits the valve to be inserted in positions where conventionally shaped valves cannot be placed.

These and other objects of the invention will become more apparent as the description proceeds with the aid of the accompanying drawings in which:

Fig. 3 is a vertical sectional elevation similar to Fig. 2 having other means for applying control pressure to the pressure control diaphragm.

Fig. 4 is an enlarged sectional view of the removable valve unit.

Fig. 5 is an enlarged section of the lower portion of the relief valve, jet tube and sliding seal shown in Figs. 2 and 3.

Figure 1:
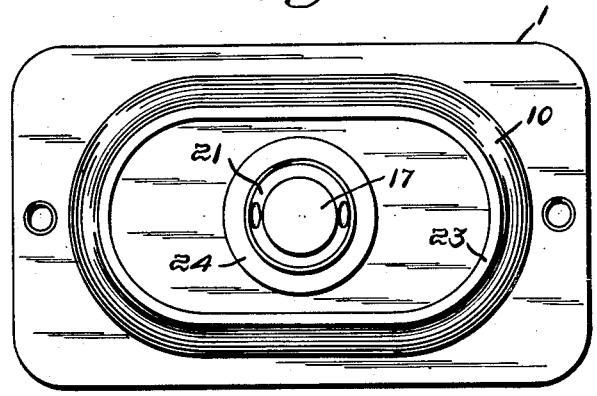
Fig. 1 is a plan view of the valve with the bonnet and control spring removed.

The valve as shown in the drawings consists of a metal valve body 1 having at the left an inlet port 2 and at the right an outlet port 3. Intermediate of these ports is a cylindrical bore 4 which contains the supply valve mechanism. Between the supply valve and the outlet port 3 is an expansion chamber 5 and thereabove a pressure control chamber 6 having a circumferential flange face 7 on which is mounted a valve bonnet 8 with an adjusting screw 9 threaded through its top. The bonnet also serves to clamp in fixed position a flexible diaphragm 10 by means of a suitable number of bolts 11.

Chambers 5 and 6 are separated from each other by a seal plate 14 forming a fixed partition therebetween which is clamped to a face on the valve body by means of a suitable number of screws 15. Restricted passages 12 and 13 provide limited communication between chambers 5 and 6.

Chamber 6 is further sealed by a seal ring 16 slidable with respect to a jet tube 19 extending through plate 14. Seal ring 16 is preferably flexible and made of rubber or neoprene or other material having the same general characteristics. Seal ring 16 is contained in the lower end of relief valve body 17. As shown, the seal ring 16 is provided with sufficient flexibility in any radial direction to take up any misalignment between the working parts while still maintaining an air-tight connection. Seal ring 16 is clamped by washer 18 which in turn is affixed to the relief valve body 17.

The jet tube 19 which passes through seal plate 14 is affixed thereto in airtight connection. The seal ring 16 slides freely over the upper end of tube 19. The lower portion of the tube extends downwardly into expansion chamber 5 with its lower end within the confines of a cylindrical bore in the upper end of supply valve pintle 20, said bore being appreciably larger than the jet tube to provide adequate area for fluid flow.

A spring 21, bearing at one end against a seat 22 and at the other end against a metal piston 23, exerts a downward force against the piston diaphragm 10 and connected parts. A clamp nut 24 is threaded on to the relief valve body 17 and clamps the diaphragm to the piston and relief valve to form a pressure tight joint. The relief valve 17 contains a seat 25 and a number of exhaust passages 26 which terminate in the exhaust chamber 27. Fluid may flow from chamber 27 to the atmosphere through the port 28.

A balanced pressure relief valve pintle 29 having a seal piston 30 is attached at its lower end to a connecting tube 31 by a ball and socket joint. The pressures in chambers 32 and 33 below and above the pintle 29 and seal piston 30 are equalized by means of a connecting passage 34 within the relief pintle. The area of the seal piston 30 is the same as the valve seat area 25 resulting in the relief valve pintle being pressure balanced.

A balanced supply valve assembly composed of a supply valve pintle 20, a clamp tube 35, a piston 36, a balance diaphragm 37, a head 38, a diaphragm clamp ring 39 and a seal ring 40 is contained within the bore provided in the valve body casting. The upper end of the clamp tube 35 is attached to the connecting tube 31 by a ball and socket joint. The lower end of clamp tube 35 is flanged to clamp the diaphragm 37 between the supply pintle 20 and the diaphragm piston 36. A lip 41 on the head 38 is formed over onto the clamping ring 39 so as to clamp the outer periphery of the diaphragm 37 firmly to the head 38.

Fluid in the passages at 43, below the end of jet tube 19, and 44, surrounding the jet tube at its lower end, can communicate freely with the balance pressure chamber 42 below diaphragm 37 by means of the radial passages 45 which connect with a central bore in clamp tube 35. The effective area of diaphragm 37 is equal to the seating area of the supply pintle 20 and in consequence the supply valve is pressure balanced with respect to the inlet port fluid pressure.

Fluid from the source of supply is delivered to the valve through inlet port 2 and thence flows through a cylindrical screen 46 which is provided to intercept dirt or other solid matter. The valve seat ring 47 forming part of the supply valve is readily removable from the valve body bore 4 by virtue of the relatively loose fit therebetween. A flexible seal ring 48 is contained within a circumferential groove provided in the valve seat ring to prevent leakage of fluid between the said ring and bore. A similar type of seal is employed as at 40 to prevent leakage between head 38 and the lower portion of bore 4. To insure closure of the supply valve pintle 20, a light compression spring 50 is positioned in balance pressure chamber 42. One end of the spring is positioned in a cavity formed by a bore in the lower side of piston 36 and the other end rests in a larger bore in the upper side of head 38.

From the description thus far it can be seen that the valve assembly or cartridge comprises a unitary structure consisting of the balanced pressure relief valve pintle 29, the connecting tube 31, the clamp tube 35, the supply valve pintle 20, the balance diaphragm 37, the diaphragm clamp ring 39, the head 38 and the included spring 50. This unit is held in position by a suitable number of screws 49. Upon removal of these screws the entire unit or cartridge may be withdrawn from the valve as the maximum diameter of relief valve piston 29 is less than the internal diameter of jet tube 19.

Figure 2:
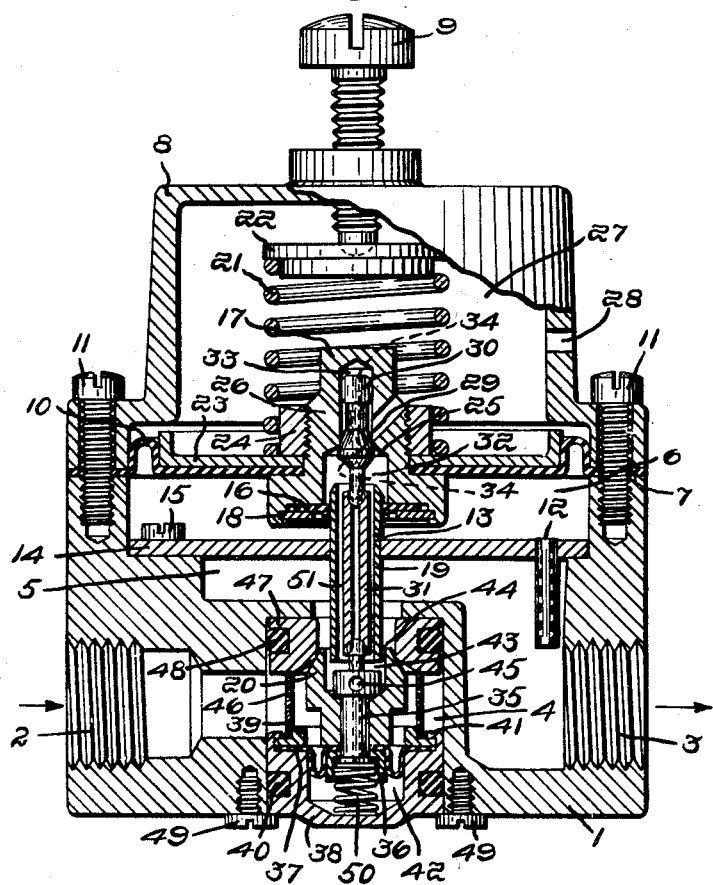
Fig. 2 is a vertical sectional elevation taken approximately through the center of the valve.

The operation of the form shown in Fig. 2 is as follows. The downward force of control spring 21 acts against piston 23, diaphragm 10, relief valve body 17, which in turn through the relief valve seat acts on relief valve pintle 29, connecting tube 31 and supply valve pintle 20. This downward force is in opposition to the upward pressure exerted against the underside of diaphragm 10 by the fluid supplied to control chamber 6 from expansion chamber 5 through the restricted passage 12. The fluid pressure in chamber 5 is responsive to the downstream pressure if supply valve pintle 20 is closed and is increased if pintle 20 is open. In addition to fluid reaching pressure control chamber 6 in the manner described, fluid may also reach chamber 6 through the annular passage between the bore in the end of supply valve pintle 20 and the lower end of the jet tube 19, thence upwardly through the annular passage 51 and laterally through the restricted passage 13.

Spring 21, acting on the parts as heretofore described, maintains the supply valve pintle 20 at a sufficient distance from its seat on the valve seat ring 47 to admit the proper quantity of fluid from the high pressure upstream side to the lower pressure downstream side to build up and maintain the required pressure at the outlet port 3. It can be seen that the supply valve is automatically opened by the downward vertical motion of diaphragm 10 and the co-operating parts to allow the flow of fluid into expansion chamber 5 and thence into control chamber 6 through the restricted passages 12 and 13 to establish a value of pressure which, acting on the underside of diaphragm 10, is in equilibrium with the downward force of spring 21.

Any increase in pressure on the downstream side at outlet port 3 above the value which is determined by the compression to which control spring 21 is subjected by the adjusting screw 9 will result in an upward movement of diaphragm 10 and all parts connected thereto, overcoming the downward force of spring 21. Such upward movement of the diaphragm allows the spring 50 to move valve pintle 20 into engagement with its seat. Whereupon any further upward movement of relief valve pintle 29 will be checked. Thereafter, continued upward movement of diaphragm 10 and associated parts will raise the relief valve body 17 and valve seat 25 from the latter's seating surface on relief valve pintle 29 thus opening the relief valve.

In this way pressure above normal on the downstream side causes the relief valve to open allowing fluid on the downstream side in the outlet port and the expansion chamber 5 to flow through the passages 44 and 43, thence through passage 51, chamber 32, past relief valve pintle 29 to passage 26, chamber 27 and out to the atmosphere through port 28. This flow of fluid will continue until the pressure in control chamber 6 is sufficiently reduced so that the control spring 21 is enabled to force the relief valve seat 25 in body 17 against relief valve pintle 29, thus cutting off the escaping flow. If, thereafter, the fluid pressure in control chamber 6 drops below the normal value, the diaphragm 10 and attached parts will move downwardly forcing relief valve pintle 29 and its connected parts downwardly, thereby to move supply valve pintle 20 away from its valve seat to open the supply valve by an amount sufficient to allow the required amount of fluid to flow through the supply valve to build up again and to maintain the normal degree of pressure in the control chamber 6. As previously mentioned, the downstream pressure reaches control chamber 6 principally through the passage 12 and to some degree through passage 13.

If a high degree of constancy in the regulated value of the downstream pressure is required, the regulator must function so that the forces which act upon the control diaphragm assembly 10 and those parts which are actuated by downward movement of such assembly, namely, the relief valve pintle 29, connecting tube 31 and the supply valve pintle 20, consist almost entirely of the downward force of the control spring 21 and the upward fluid pressure acting on the underside of diaphragm 10. It is for this reason that both the relief and supply valve pintles are balanced pressure valves. The influence of the supply valve pintle closure spring 50 tends to cause a slight difference in the regulated pressure when the valve is acting as a relief valve, as compared with the valve acting as a reducing valve supplying normal flow out through the outlet port 3.

Accordingly, the construction of the present valve is novel in that the undesirable influence of spring 50 is greatly reduced by means now to be referred to. By the present design, a relief valve chamber 32 is formed in the relief valve body 17 with the bottom thereof sealed in part by the seal ring 16 which slides axially on the jet tube 19. This separate pressure area in the said relief valve chamber causes the development of a downward force in the relief valve structure when a reduced pressure is created therein by means which will hereafter be explained. This downward force is transmitted through relief valve pintle 29, connecting tube 31 and clamp tube 35 to counter-balance the upward force of valve spring 50.

This downward force is created by the development in the above-mentioned relief valve chamber of a substantially reduced pressure which is generated by the suction effect caused by the high velocity of the fluid as it flows along the seating surface of valve seat 47 and the co-acting surface of supply valve pintle 20. The fluid when flowing through the supply valve is conical in shape and impinges on the circumference of jet tube 19. The fluid flowing in this manner is concentrated into a high velocity thin conical stream or jet by the appropriate configuration of the seat ring 47 and the corresponding configuration of the seating surface of the supply valve pintle 20. The conical annular jet formed by fluid passing through the valve at high velocity produces a pocket of considerably reduced pressure along the lower end of jet tube 19 below the point of impingement and such reduced pressure will extend to the passage 44 at the lower end of the jet tube.

Upon the opening of supply valve pintle 20 the velocity of the thin annular conical jet passing through the supply valve is substantially constant regardless of the extent of the opening of the valve. The velocity is determined by the pressure difference across the supply valve and is independent of the volume of fluid flowing and the velocity is substantially constant so long as the pressure difference is greater than aproximately a two to one ratio. Therefore, since there is no change in velocity as supply valve 20 opens in varying degrees, the value of the reduced pressure in passage 44 will build up rapidly and remain at a substantially constant figure over a wide range in the volume of flow past the supply valve.

The reduced pressure in passage 44 is transmitted through annular passage 51 to the relief valve chamber 32 and thence via the connecting passage 34 to upper chamber 33 above seal piston 30. The reduced pressure thus created provides a substantially constant downward force by virtue of the piston effect of the seal ring 16 that is slidable on jet tube 19 substantially independent of the extent of the opening of supply valve pintle 20. The pressure area of the aperture in the seal ring 16 is designed to produce a downward pressure force equal to the upward force of valve spring 50 and this downward force is added to the force exerted by spring 21. In this way, immediately upon the opening of supply valve pintle 20, the undesirable influence of the upward force of spring 50 is counteracted and for all practical purposes is entirely removed. Since the reduced pressure in relief valve chamber 32 above seal ring 16 remains substantially constant regardless of the opening of supply valve pintle 20, spring 50 is substantially neutralized over the range of travel of the supply valve.

It is well known in the art of reducing valves utilizing spring opposed diaphragms that reduction of force in the control spring occurs increasingly with downward movement of the diaphragm and associated parts. This results in a corresponding reduction of the regulated pressure because the pressure acting on the diaphragm will always be in equilibrium with the opposing spring force.

In order to reduce this effect, there is provided in the present valve a tube forming a restricted passage 12 with its upper end terminating in control chamber 6 and its lower end terminating within the expansion chamber and adjacent the outlet port substantially at the position of highest fluid velocity when fluid is leaving the expansion chamber 5 and flowing downstream while supply valve 20 is open. Thus a suction effect is created in tube 12. The velocity of fluid passing the lower end of tube 12 will vary with the extent of the opening of supply valve 20. Increasing velocity results in a corresponding reduction in the pressure within the tube and correspondingly in chamber 6, producing a reduction in the value of the pressure therein to act upon diaphragm 10 thereby to assist spring 21 and to cause supply pintle 20 to open the required additional amount to make up for the loss in control spring force as the result of its downward movement.

In other words, the pressure in control chamber 6 is lower than the downstream pressure by an amount which will cause sufficient additional opening of supply valve pintle 20 to bring the downstream pressure back to normal. As the downstream pressure is raised and restored to normal, such increasing pressure will gradually pass through restricted passage 12 to raise the pressure in control chamber 6 lifting the diaphragm 10 and the associated relief valve 17 to permit closing of supply valve pintle 20.

In some applications which require stiff control springs 21, it is found that the supplemental pressure reduction created through passage 12 in control chamber 6 is insufficient to compensate for the loss in force of control spring 21 as the diaphragm is moved downwardly. Therefore, it is necessary to increase the reduction in pressure in chamber 6. This is accomplished by means of the restricted passage 13 that is introduced through the side wall of jet tube 19 connecting with passage 51 and control chamber 6. Thus as soon as supply valve pintle 20 has opened, the highly reduced pressure produced by the conical jet of fluid flowing through the supply valve will extend not only to chamber 32 but will also additionally reduce the pressure in control chamber 6 by sucking out through passage 13 an additional amount of the control chamber air.

The amount of the reduction in pressure caused by the restricted passage 13 is determined by the relative size of passage 13 in relation to passage 12. As passage 13 is increased in size with respect to passage 12, the amount of the pressure reduction in chamber 6 will be correspondingly increased whenever the supply valve pintle 20 is opened.

In order to prevent the supply valve from chattering or singing due to sudden and abrupt changes in pressure in control chamber 6, the chamber is fed by the two passages 12 and 13 which by virtue of their relatively small size restrict the flow into the chamber, thereby smoothing out any abrupt pressure waves occurring on the downstream side of the valve in the expansion chamber or beyond. This eliminates high fluctuating changes of pressure acting against the underside of diaphragm 10, and stops chattering or singing of supply valve pintle 20.

It should also be noted that control chamber 6 is sealed except for the restricted passages 12 and 13. When the relief valve pintle 29 opens due to excessive downstream pressure, the fluid escaping from the valve does not flow through chamber 6 but instead flows through passages 44, 43, 51, into relief valve chamber 32, and thence out.

A modified form of the invention is shown in Fig. 3. This construction differs from that shown in Fig. 2 only in that a modified means is used for applying pressure to the top side of diaphragm 10. In Fig. 2 the downward pressure was applied by control spring 21. In Fig. 3 the downward pressure is applied by compressed fluid exerting a force against a second diaphragm positioned above and connected to diaphragm 10.

In Fig. 3, the valve construction in the lower part of the housing and up to and including the relief valve pintle 29 and diaphragm 10 is the same as that heretofore described. The modification consists of a second diaphragm 55 of suitable area which is mounted thereabove and supported by a piston 56 which piston is separated from and maintained in fixed relation to piston 23 by a hollow cylindrical spacer 57 enabling the clamp nut 58 to be set up tightly on relief valve body 17 to clamp both diaphragms 10 and 55 in firm spaced relation.

The outer peripheries of diaphragms 10 and 55 are clamped between cover 59, a spacer ring 60, which ring extends about the circumference of the valve body and the upper surface of the valve body. The clamping of these parts is accomplished by the use of a suitable number of cap screws 61 of which two are shown. The ports 62 in the relief valve body 17 correspond to ports 26 shown in Fig. 2 and are in series with other laterally extending ports 63 through the wall of the cylindrical spacer 57. Additional ports 64 extend laterally through the spacer ring 60 to the atmosphere. Obviously, when relief valve pintle 29 is open to relieve excess pressure in chamber 5, fluid may escape from relief valve chamber 32 through ports 62, 63 and 64 to the atmosphere.

Downward pressure is applied to the upper side of diaphragm 55 by means of a compressed fluid brought to the interior of cover 59 by pipe 65. This fluid pressure may be either a liquid or gaseous and may be maintained at and adjusted from time to time to any desired figure by controls at a remote point. This fluid pressure acts as a substitute for the pressure of control spring 21 of Fig. 2. The actuation of the valve under the influence of this substituted pressure is exactly the same as the actuation of the valve heretofore described. The pressure on the upper side of diaphragm 55 is opposed by the pressure on the underside of diaphragm 10. The two diaphragms operate as a single unit because of the rigid connection therebetween. Further explanation of the construction of Fig. 3 is believed unnecessary since its mode of operation is the same as that of Fig. 2.

The sectional vertical detail in Fig. 4 is an enlargement to double scale of the valve cartridge or unit shown in Figs. 2 and 3 and will be helpful in understanding more certainly the various parts of the removable unit.

Attention is called to the plan view of the valve shown in Fig. 1. It will be noted that the diaphragm 10 is not in the conventional circular form. On the contrary, it has been shaped to conform generally with the outer dimensions of the valve body. In the construction of a valve of this type it is preferable that the inlet and outlet ports be aligned and that the supply valve be positioned therebetween. This arrangement of three principal elements positioned in a row calls for a rectangular body formation as the most practical construction. Ordinarily, the diaphragm of a pressure regulator, if of the usual circular formation, will extend laterally beyond the confines of the lower body portion. In the present construction, the overhanging circular diaphragm has been eliminated through the use of the elongated diaphragm. This enables the valve to be placed in a pipeline which might be running close to a wall. It also makes it possible to pack the valves for shipping more compactly. I, therefore, consider the shape of the diaphragm as part of my invention. This construction provides adequate diaphragm area and it operates as effectively as the conventional circular construction.

It is my intention to cover all changes and modifications of the example of the invention herein chosen for purposes of the disclosure which do not constitute departures from the spirit and scope of the invention.

I claim:

1. A pressure regulator valve comprising a valve body having an inlet port and an outlet port, a supply valve including a valve seat and a supply valve pintle between said ports, an expansion chamber on the outlet side of said supply valve, a pressure control chamber comprising a fixed partition forming one wall and a movable diaphragm forming another wall, a relief valve including a valve seat carried by said diaphragm and movable therewith, a relief valve pintle for engaging said relief valve seat, means for exerting an external force against said diaphragm, a tube extending from said expansion chamber to a sealed space in which said relief valve is located and in which is an area associated with said diaphragm subject to pressure transmitted through said tube, said supply valve pintle and relief valve pintle connected to each other whereby longitudinal movement of one valve pintle will cause corresponding longitudinal movement of the other valve pintle, a restricted passage leading from said outlet side of said supply valve into said pressure control chamber, and means urging said valve pintles toward closed position.

2. A pressure regulator valve as set forth in claim 1 and including in addition means for creating a pressure in said tube less than the pressure in the said expansion chamber, said means comprising said tube of sufficient length to have its entrance end extending into the confines of the fluid stream that flows from said supply valve pintle into said expansion chamber when said supply valve is open, said tube acting as a means for transmitting said reduced pressure to said sealed space.

3. A pressure regulator valve comprising a valve body having an inlet port and an outlet port, a supply valve including a valve seat and a supply valve pintle between said ports, an expansion chamber on the outlet side of said supply valve, a pressure control chamber comprising a fixed partition forming one wall and a movable diaphragm forming another wall, a relief valve including a valve seat carried by said diaphragm and movable therewith, a relief valve pintle for engaging said relief valve seat, means for exerting an external force against said diaphragm, a tube extending from said expansion chamber to said relief valve forming a passage therebetween, said supply valve pintle and relief valve pintle connected to each other whereby longitudinal movement of one valve pintle will cause corresponding longitudinal movement of the other valve pintle, a restricted passage leading from said outlet side of said supply valve into said pressure control chamber, means urging said valve pintles toward closed position, and means for creating a pressure in said tube less than the pressure in the expansion chamber said means comprising said tube of sufficient length to have its entrance end extending into the confines of the fluid stream that flows from said supply valve pintle into said expansion chamber when said supply valve is open, said tube acting as a means for transmitting said reduced pressure to said relief valve, said supply valve pintle supported by a diaphragm whose pressure area is substantially equal to the supply valve seat area and a passage extending from the expansion chamber side of said supply valve pintle to the under side of said supply valve pintle diaphragm to provide a pressure balanced supply valve pintle.

4. A pressure regulator valve comprising a valve body having an inlet port and an outlet port, a supply valve including a valve seat and a supply valve pintle between said ports, an expansion chamber on the outlet side of said supply valve, a pressure control chamber comprising a fixed partition forming one wall and a movable diaphragm forming another wall, a relief valve including a valve seat carried by said diaphragm and movable therewith, a relief valve pintle for engaging said relief valve seat, means for exerting an external force against said diaphragm, a tube extending from said expansion chamber to said relief valve forming a passage therebetween, said supply valve pintle and relief valve pintle connected to each other whereby longitudinal movement of one valve pintle will cause corresponding longitudinal movement of the other valve pintle, a restricted passage leading from said outlet side of said supply valve into said pressure control chamber, means urging said valve pintles toward closed position, means for creating a pressure in said tube less than the pressure in the said expansion chamber said means comprising said tube of sufficient length to have its entrance end extending into the confines of the fluid stream that flows from said supply valve pintle into said expansion chamber when said supply valve is open, said tube acting as means for transmitting said reduced pressure to said relief valve and a second restricted passage connecting said pressure control chamber with the said reduced pressure area.

5. A pressure regulator valve comprising a valve body having an inlet port and an outlet port, a supply valve including a valve seat and a supply valve pintle between said ports, an expansion chamber on the outlet side of said supply valve, a pressure control chamber, a movable diaphragm forming a wall of the said pressure control chamber, a relief valve including a valve seat carried by said diaphragm and movable therewith, a relief valve pintle for engaging said relief valve seat, means for exerting an external force against said diaphragm, a tube extending from said expansion chamber to said relief valve, said supply valve pintle and relief valve pintle connected to each other whereby longitudinal movement of one valve pintle will cause corresponding longitudinal movement of the other valve pintle, a restricted passage leading from said outlet side of said supply valve into said pressure control chamber, means urging said valve pintles toward closed position, means for creating a pressure in said tube less than the pressure in the said expansion chamber, said means comprising said tube of sufficient length to have its entrance end extending into the confines of the fluid stream that flows from said supply valve pintle into said expansion chamber when said supply valve is open, said tube acting as means for transmitting said reduced pressure to said relief valve, said supply valve pintle supported by a diaphragm whose pressure area is substantially equal to the supply valve seat area and a passage extending from the expansion chamber side of said supply valve pintle to the under side of said supply valve pintle diaphragm to provide a pressure balanced supply valve pintle, a seal piston connected to said relief valve pintle, a chamber in the said relief valve in which said seal piston is movable and a passage extending from said seal piston chamber to said relief valve, the effective area of said seal piston being substantially equal to the effective area of said relief valve seat to provide a pressure balanced relief valve pintle.

6. A pressure regulator valve comprising a valve body having an inlet port and an outlet port, a supply valve including a valve seat and a supply valve pintle between said ports, an expansion chamber on the outlet side of said supply valve, a pressure control chamber, a movable diaphragm forming a wall of the said pressure control chamber, a relief valve including a valve seat and a relief valve chamber carried by said diaphragm, a relief valve pintle for engaging said relief valve, means for exerting an external force against said diaphragm, a jet tube extending from said expansion chamber through said pressure control chamber and into said relief valve chamber, said jet tube fixed with respect to said expansion and control chambers, said supply valve pintle and relief valve pintle connected to each other by means extending through said jet tube whereby longitudinal movement of one valve pintle will cause corresponding longitudinal movement of the other valve pintle, a restricted passage leading from said outlet side of said supply valve into said pressure control chamber, a slidable seal carried by said relief valve engaging the outer circumference of said jet tube and separating said pressure control chamber from said relief valve chamber whereby said relief valve may move longitudinally with respect to said jet tube under the influence of said diaphragm, and means urging said valve pintles toward closed position.

7. A valve construction as set forth in claim 6 in which a second restricted passage connects said pressure control chamber with the interior of said jet tube.

8. A valve as set forth in claim 6 in which the supply valve pintle and its corresponding seat are so shaped that when opened fluid flowing from said inlet port through said supply valve will be in the form of a cone and will impinge on and flow upwardly along the circumference of said jet tube above the lower end thereof to reduce the pressure in said jet tube and in said relief valve chamber below the pressure in said expansion chamber.

9. A valve as set forth in claim 1 having a diaphragm supporting said supply valve pintle, said diaphragm secured to a head removably attached to said valve body in an opening in said body that is larger than said supply valve pintle, the transverse dimensions of said relief valve pintle being smaller than the passage through which the connection between said supply valve pintle and said relief valve pintle extends whereby said head, supply valve pintle and said relief valve pintle may be withdrawn from said valve body as a unit.

10. A valve as set forth in claim 6 having a conically shaped supply valve pintle concentric with and surrounding the lower end of said jet tube so as to produce a conical stream of fluid flowing against the circumference of said jet tube when said supply valve is open and fluid flows from the high pressure inlet port to the lower pressure expansion chamber thereby to produce a reduced pressure within said jet tube and relief valve pintle chamber, a diaphragm supporting said supply valve pintle, said means urging said valve pintles toward closed position being a compression spring beneath said supply valve pintle diaphragm, a passage from said jet tube to the underside of said supply valve pintle diaphragm, the effective area of the aperture in said slidable seal about said jet tube and which area is subjected to said reduced pressure through said jet tube and the area of said supply valve pintle diaphragm being such as to produce a downward force substantially equal to the upward force of said compression spring.

11. A pressure regulator valve comprising a valve body having an inlet port and an outlet port, a supply valve including a valve seat and a supply valve pintle between said ports, said supply valve pintle having a bore in its end and being affixed to a balance diaphragm mounted on said body, said diaphragm being exposed to inlet port pressure on one side and to a balance pressure chamber on the other, an expansion chamber on the outlet side of said supply valve, a pressure control chamber, a movable pressure control diaphragm forming a wall of said pressure control chamber, a relief valve including a valve seat and a relief valve chamber carried by said pressure control diaphragm, a relief valve pintle for engaging said valve seat, means for exerting a controlled greater than atmospheric pressure against said pressure control diaphragm inwardly of said control chamber, a jet tube of less diameter at its lower end than the bore in said supply valve pintle extending from a point close to the end of said bore through said expansion chamber and through said control chamber and into said relief valve chamber, said jet tube fixed with respect to said expansion and control chambers, said supply valve pintle and relief valve pintle connected to each other by means extending through said jet tube whereby movement of one valve pintle will cause corresponding movement of the other valve pintle, a restricted passage leading from said outlet side of said supply valve into said control chamber, a second restricted passage leading from said jet tube to said control chamber, a slidable seal about the outer circumference of said jet tube separating said control chamber and said relief valve chamber whereby said relief valve may move longitudinally with respect to said jet tube under the influence of said pressure control diaphragm, a spring in said balance pressure chamber urging said valve pintles toward closed position and a passage connecting said relief valve chamber, said bore and said balance pressure chamber whereby the pressure present in said bore at any time may be communicated to said relief valve chamber and said balance pressure chamber.

12. A pressure regulator valve comprising a valve body having an inlet port and an outlet port, an expansion chamber, a pressure control chamber, a supply valve between said inlet port and said expansion chamber, a pressure control diaphragm forming a wall of said pressure control chamber, a relief valve carried by said pressure control diaphragm, a jet tube leading from said relief valve to said expansion chamber, a relief valve pintle and a supply valve pintle axially aligned and in fixed longitudinal relationship, said relief valve sealed from said pressure control chamber by a slidable seal connection surrounding said jet tube, a restricted passage leading from said outlet port side of said supply valve to said pressure control chamber and adjustable means for exerting an inward pressure on said pressure control diaphragm.

13. A pressure regulator valve comprising a valve body having an inlet port, an expansion chamber and an outlet port, and a supply valve between said inlet port and said expansion chamber, a jet tube leading from said expansion chamber to a relief valve longitudinally movable with respect to said jet tube, a relief valve chamber in said relief valve with which said jet tube communicates, a relief valve pintle and a supply valve pintle, a connection between said valve pintles whereby downward movement of said relief valve pintle will cause opening of said supply valve pintle, a bore in the end of said supply valve pintle into which extends the lower end of said jet tube, said supply valve pintle being conical so that when open a conical stream of fluid will impinge on the circumference of said jet tube in said expansion chamber thereby to cause a reduction in pressure in said bore, jet tube and relief valve chamber, a balance diaphragm fixed with respect to said body and carrying said supply valve pintle, a balance pressure chamber on the lower side of said balance diaphragm, a spring urging said valve pintles toward closed position and a passage between said bore and balance pressure chamber whereby the pressure present at any time in said bore may be communicated to said balance pressure chamber, a pressure control chamber, a pressure control diaphragm connected with said relief valve and a restricted passage whereby the pressure in said expansion chamber may be communicated relatively slowly to said pressure control chamber and means constantly urging said pressure control diaphragm inwardly of said pressure control chamber.

14. A pressure regulator valve having a valve body, a supply valve seat and a relief valve seat coaxial with each other, said supply valve seat fitting loosely within said valve body and sealed with respect to said body by a peripheral sealing member, a removable unit comprising a relief valve pintle, a supply valve pintle, means connecting said valve pintles and holding them in fixed longitudinal relationship, a supporting head, and a diaphragm mounted on said head supporting said supply valve pintle, said unit being removable from said valve body as a single element and said supply valve seat being removable from said valve body after said unit has been removed from said valve body.

15. A pressure regulator valve comprising a supply valve and a relief valve, said relief valve attached to a pressure measuring diaphragm forming a wall of a pressure control chamber, a fixed partition forming another wall of said pressure control chamber, a tube directly connecting the outlet side of said supply valve to said relief valve, said pressure control chamber being substantially sealed except for one or more restricted passages leading to the outlet side of said supply valve whereby when said relief valve is open fluid escaping therefrom will not pass through said pressure control chamber.

16. For use in a pressure regulator valve of the supply and relief type a valving unit including a supply valve pintle and a relief valve pintle having a mechanical coupling between said pintles which offers substantial restraint in the axial direction of said pintles, said pintles and coupling having bores therethrough arranged in series to form a continuous passage from one end of said unit to the other.

17. Means for producing a reduced pressure in a pressure regulator valve having an inlet port, an expansion chamber and an outlet port, said means comprising a supply valve between said inlet port and said expansion chamber, said supply valve including a circular valve seat and a cooperating conically shaped supply valve pintle which supply valve when open and when the pressure on said inlet side is substantially in excess of the pressure in said expansion chamber will produce a conical fluid stream of high velocity, a tube fixed with respect to said expansion chamber and terminating within a cavity in the upper end of said supply valve pintle in substantial axial alignment therewith and with its lower end below the point of impingement of said conical fluid stream, said stream acting by virtue of its velocity to draw fluid out of the lower end of said tube thereby to reduce the pressure in said tube.

18. A pressure regulator valve comprising a valve body with an inlet port, an expansion chamber and an outlet port, a supply valve between said inlet port and said expansion chamber, a supply valve pintle carried by a balance diaphragm equal in effective area to the valve seat of said supply valve pintle, a passage through said supply valve pintle leading from said expansion chamber to the under side of said diaphragm, a pressure control chamber having a pressure control diaphragm forming one wall thereof, a relief valve mounted on said pressure control diaphragm, a relief valve pintle normally closing said relief valve and in axial alignment with said supply valve pintle and connected thereto in fixed longitudinal relationship, a seal piston movable in a piston chamber and connected to said relief valve pintle, a passage through said relief valve pintle and seal piston and a passage leading from said expansion chamber to said relief valve, a restricted passage between said expansion chamber and said pressure control chamber, the said relief valve sealed from said pressure chamber whereby upon the opening of said relief valve upon sufficient increase of pressure in said pressure control chamber fluid will escape from said relief valve by flowing from said expansion chamber through said passage to said relief valve without passing through said pressure control chamber.

19. A pressure regulator valve comprising a supply valve and a relief valve, said relief valve being attached to a pressure measuring diaphragm forming a wall of a pressure control chamber, a fixed partition forming another wall of said pressure control chamber, an expansion chamber, a tube extending from said expansion chamber to a sealed space in which said relief valve is located and in which is an area associated with said diaphragm subject to pressure transmitted through said tube, said diaphragm being responsive to the pressure in said pressure control chamber, said pressure control chamber being sealed except for one or more restricted passages leading to the outlet side of said valve.

20. A pressure regulator valve comprising a supply valve and a relief valve, an expansion chamber, a pressure control chamber sealed except for one or more restricted passages leading from said pressure control chamber to said expansion chamber, one of said restricted passages terminating at a point where the fluid passing through said expansion chamber will be moving at high velocity, and a tube extending from said expansion chamber to a sealed space in which said relief valve is located and in which is an area associated with said diaphragm subject to pressure transmitted through said tube.

References Cited in the file of this patent

UNITED STATES PATENTS

| Number | Name | Date |
|---|---|---|
| 331,544 | Reinecke | Dec. 1, 1885 |
| 404,504 | Rose | June 4, 1889 |
| 942,042 | Petley | Nov. 30, 1909 |
| 2,239,116 | Ray | Apr. 22, 1941 |
| 2,259,809 | Freeman | Oct. 21, 1941 |
| 2,278,728 | McKinley | Apr. 7, 1942 |
| 2,304,782 | Donaldson | Dec. 15, 1942 |

FOREIGN PATENTS

| Number | Country | Date |
|---|---|---|
| 156,543 | Germany | July 10, 1939 |